(12) United States Patent
Zhang et al.

(10) Patent No.: US 11,692,590 B2
(45) Date of Patent: Jul. 4, 2023

(54) SLEWING BEARING AND APPLICATIONS THEREOF

(71) Applicant: Aktiebolaget SKF, Gothenburg (SE)

(72) Inventors: Guo Jiang Zhang, Shanghai (CN); Bo Han, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/564,329

(22) Filed: Dec. 29, 2021

(65) Prior Publication Data

US 2022/0228628 A1 Jul. 21, 2022

(30) Foreign Application Priority Data

Jan. 19, 2021 (CN) .......................... 202110068245.8

(51) Int. Cl.
*F16C 19/06* (2006.01)
*F16C 33/58* (2006.01)
*F16C 33/66* (2006.01)

(52) U.S. Cl.
CPC .......... *F16C 33/6685* (2013.01); *F16C 19/06* (2013.01); *F16C 33/581* (2013.01); *F16C 33/6607* (2013.01); *F16C 2300/14* (2013.01); *F16C 2360/31* (2013.01); *F16C 2361/61* (2013.01)

(58) Field of Classification Search
CPC .. F16C 19/06; F16C 33/6607; F16C 33/6622; F16C 33/6685; F16C 2300/14; F16C 2360/31; F16C 2361/61; F16C 33/581; F16H 1/16; F16H 57/0427; F16H 57/045; F16H 57/0453; F16H 57/0471; F16H 57/0486; F16H 57/0493; F16H 57/0498
See application file for complete search history.

(56) References Cited

U.S. PATENT DOCUMENTS

| 5,403,100 A * | 4/1995 | Freitag ................... F16C 19/10 384/477 |
| 7,077,630 B2 * | 7/2006 | Wobben .................. F03D 80/70 416/174 |

FOREIGN PATENT DOCUMENTS

| CN | 201747524 U * | 2/2011 | .......... F16C 33/6685 |
| DE | 102013010500 A1 * | 1/2015 | ............ F16C 19/166 |
| JP | 2003222140 A * | 8/2003 | .......... F16C 33/3706 |
| WO | WO-2012146382 A1 * | 11/2012 | ............... F03D 11/02 |

* cited by examiner

*Primary Examiner* — Phillip A Johnson
(74) *Attorney, Agent, or Firm* — Garcia-Zamor Intellectual Property Law, LLC; Ruy Garcia-Zamor

(57) ABSTRACT

A slewing bearing for vertical structural support, including a first bearing ring, a second bearing ring and at least one row of rolling elements arranged between the first and second bearing rings. The first or second bearing ring is provided with a gear for receiving the drive of an input torque, and the gear is provided axially thereunder with a lubricant collecting member for keeping the lubricant. A rotary support device is provided for supporting in a vertical structure. The device provides a first member that supports substantially in a vertical direction, a second member that is substantially supported by the first member in the vertical direction, and the slewing bearing acting as a rotary support between the first and second members. The first member is fixedly connected to the first bearing ring and the second member is fixedly connected to the second bearing ring.

10 Claims, 6 Drawing Sheets

Prior Art

SLEWING BEARING AND APPLICATIONS THEREOF

CROSS-REFERENCE TO RELATED APPLICATIONS

This application claims priority to Chinese Patent Application no. 202110068245.8, filed Jan. 19, 2021, the contents of which is fully incorporated herein by reference.

TECHNICAL FIELD

The invention relates to a slewing bearing, in particular one that plays a role of rotary support in a vertical structure.

BACKGROUND ART

In most cases, a slewing bearing is a large-size rolling bearing, which adapts to a single or combined action of axial load, radial load and moment load in any directions. It can perform both pivotal and rotary motions. In a typical example shown in FIGS. 1a and 1b, the slewing bearing 1 includes an inner bearing ring 10, an outer bearing ring 20 and at least one row of rolling elements 30 arranged between the inner and the outer rings. Usually, one of the inner ring 10 and the outer ring 20 contains a gear 21, which is arranged on the radially outer surface of the outer ring (as shown in the figures) or the radially inner surface of the inner ring (not shown) as required, and which is used for receiving the drive input of an external torque, thereby driving one of the bearing rings to rotate relative to the other of the bearing rings.

When used for vertical structural support, a widthwise direction of the gear teeth is roughly the same as the axial direction of the bearing (corresponding to the vertical direction in the figures), such that the lubricant will flow and gather downward along the tooth surface under the action of gravity. In case there is no collection device provided for recycling of the lubricant, the lubricant will not only leak out and pollute the environment, but also cause the gear to be in an oil-lean (inadequate lubrication) state in a long term, which gives rise to premature wear and corrosion, thereby causing the entire bearing to become a vulnerable part and posing a serious threat to the long-term reliable operation of the transmission system. Taking the yaw bearing of a wind turbine as an example, the gears located on the outer ring of the bearing are exposed to wind, sun and rain for a long time. In the absence of lubrication protection, they are extremely susceptible to corrosion, damage or even broken teeth falling off, thereby becoming a long-term hidden danger of failure of the wind turbine.

A fundamental reason for the above-mentioned problems is that the arrangement of traditional gears pays more attention to the processing convenience with cost consideration of the bearing rings, without taking into account the special needs of the gears for the way of lubrication in vertical applications of the bearing. The reality calls for a slewing bearing with an improved structure that can meet the special requirements for gear lubrication in vertical structure support.

SUMMARY OF THE INVENTION

In order to solve the above-mentioned technical problems, the present invention provides an improved slewing bearing for vertical structure support, comprising a first bearing ring, a second bearing ring and at least one row of rolling elements arranged between the first and second bearing rings. The first or second bearing ring is provided with a gear for receiving the drive of an input torque, which gear is provided axially thereunder with a lubricant collecting member for collecting and storing the lubricant.

In the above-mentioned slewing bearing, the lubricant-collecting member is configured to collect lubricant, which not only prevents the lubricant from leaking out, but also eliminates the potential failure risk of the gear due to long-term corrosion and oil-lean operation.

On the basis of the above-mentioned slewing bearing, the present invention also provides a rotation support device used for support in a vertical structure, which includes a first member that supports substantially in a vertical direction, a second member that is supported substantially in the vertical direction by the first member, and a slewing bearing for rotary support between the first and second members. The first member is fixedly connected with the first bearing ring of the bearing and the second member is fixedly connected with the second bearing ring of the bearing. When the gear provided on the second bearing ring is driven by an input torque, it drives the second member to rotate relative to the first member.

The above-mentioned rotary support device can avoid bearing failure due to lack of gear lubrication, which is therefore particularly helpful in ensuring the long-term reliable operation of the relevant transmission system.

The various embodiments and advantageous technical effects of the present invention will be described in detail with reference to the accompanying drawings, as below.

BRIEF DESCRIPTION OF THE DRAWINGS

FIG. 1b is a partially enlarged cross-sectional view of FIG. 1a;

FIG. 2b is a partially enlarged cross-sectional view of FIG. 2a;

FIG. 3b is a partially enlarged cross-sectional view of FIG. 3a; and

DETAILED DESCRIPTION OF EMBODIMENTS

In the whole text of the specification and claims of the present invention, terms such as "upper", "lower", "radial" and "axial" that indicate positions and orientations should be understood as referring to the specific orientation of the bearing shown in the figures and their central axes of rotation (not shown) in the vertical application.

Figure 1A:
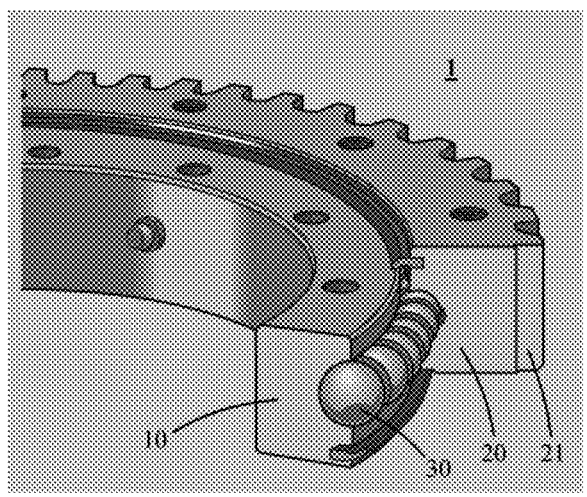
FIG. 1a shows a typical structure of a traditional slewing bearing with gears arranged on the radially outer surface of the outer ring.
Figure 1B:
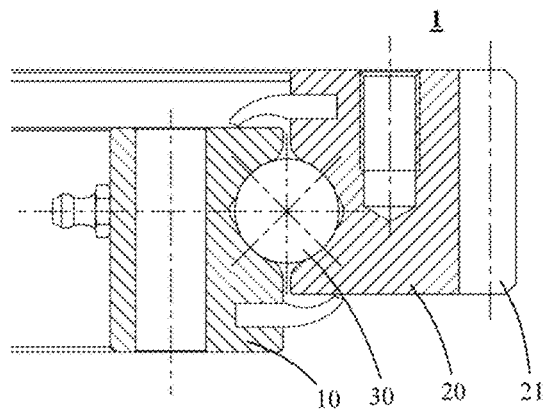

As a typical prior art structure, FIGS. 1a and 1b respectively show a technical solution in which a conventional slewing bearing is provided with a gear 21 driven by an input torque on the radially outer surface of the outer ring of the bearing 1. Alternatively, the gear 21 may also be arranged on the radially inner surface of the inner ring of the bearing (not shown). In order to prevent the lubricant from flowing downward under the action of gravity and causing leakage, a lubricant gathering member 22 is provided under the gear 21 in the present invention, as shown in FIGS. 2 to 3. As a preferred embodiment, the lubricant collecting member 22 can be formed integrally with the gear 21 and fixedly arranged on the outer ring 20 or the inner ring 10 of the bearing in the form of a gear plate 40. The lubricant collecting member 22 is used for collecting and storing the lubricant but does not hinder the normal meshing of the gear 21 with any torque input gear or worm (to be described later).

Figure 2A:
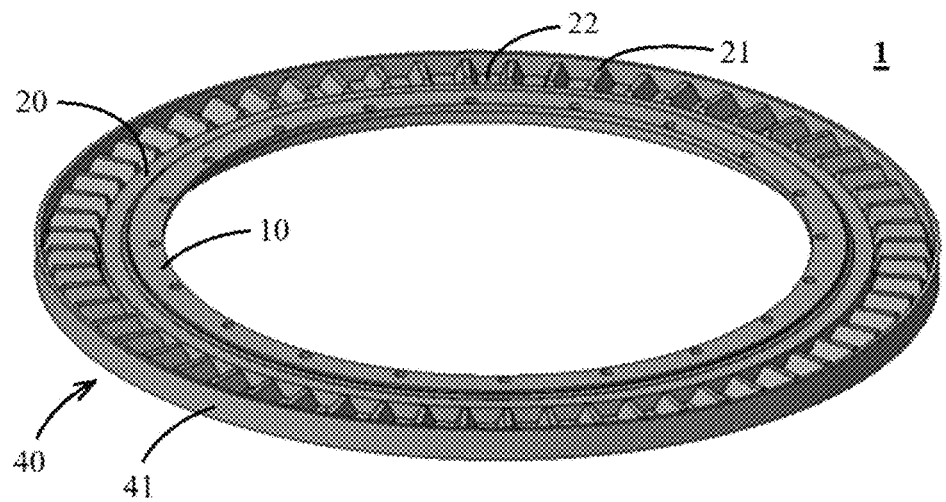
FIG. 2a shows an embodiment of an improved slewing bearing with a gear plate on the outer ring of the bearing.
Figure 2B:
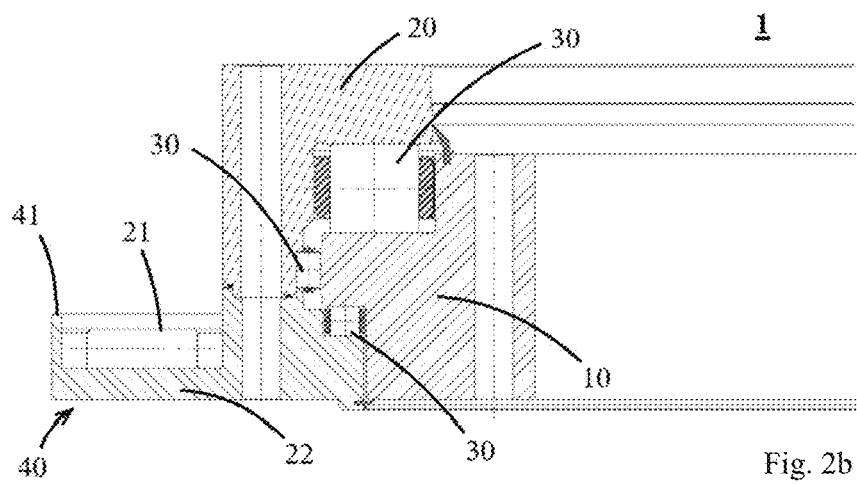

FIGS. 2a and 2b show the specific embodiment in which the gear plate is fixedly arranged on the outer ring of the bearing. The gear plate can be reliably fixed on the outer ring of the bearing by any suitable means such as bonding or fastening (e.g., by bolts), or it can be directly processed and formed on the bearing ring during the manufacturing process of the bearing ring. No matter what method is adopted, as long as the gear plate can be reliably fixed on the bearing ring, the objective of the present invention can be achieved.

FIG. 2b is a partially enlarged cross-sectional view of FIG. 2a, showing a structure of the gear plate and its connection with the bearing ring. As a specific embodiment, the gear 21 may be seated in the gear plate 40 with the tooth tops facing upward and the tooth height being substantially consistent with the axial direction of the bearing. When used for support of a vertical structure, the tooth surfaces of the gear plate 40 face upward so that the lubricant naturally gathers at the bottom of the gear plate. As required by the lubrication, the lubricant can cover the tooth roots of the gear 21 or fill between the tooth grooves to ensure that the gear is always in a good lubrication state.

In the specific embodiment shown in FIG. 2, the gear plate 40 on the bearing outer ring 20 is provided with a rib 41 on radial edge thereof away from the bearing inner ring 10 to prevent the lubricant from leaking out of the edge. The existence of the rib 41 constructs the gear plate 40 as a lubricant gathering sump with a certain depth, which can be higher than the tooth tops of the gear if necessary, so that on the one hand, the gear can be immersed in the lubricant to achieve an oil-bath lubrication, and on the other hand, the rib can also prevent the lubricant from splashing or overflowing the gear plate to a sufficient degree. Technically, the oil-bath lubrication does not require the tooth tops to be completely immersed in the lubricant. In many cases, the lubricant partially retained at the tooth roots or between the tooth grooves can also achieve sufficient lubrication effect, ensuring that the gear is always in a good lubrication state.

Obviously, the above-mentioned embodiment is suitable for the case where the outer ring of the bearing receives the input of an external torque.

Figure 3A:
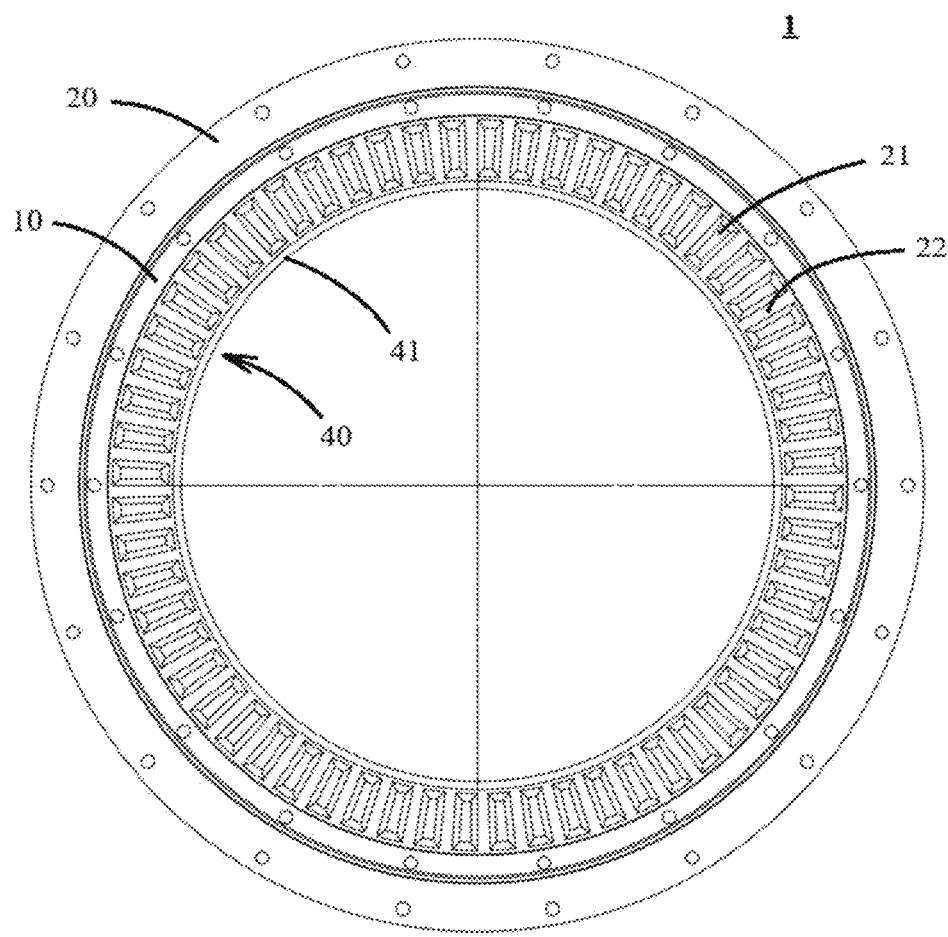
FIG. 3a is a top view of a slewing bearing with a gear plate on the inner ring.
Figure 3B:
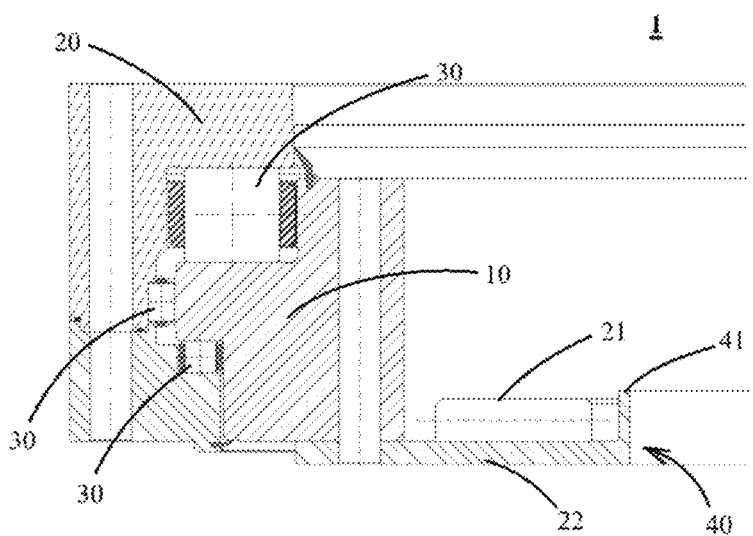

FIGS. 3a and 3b show the case where the gear plate is arranged on the inner ring of the bearing. Similar to those shown in FIG. 2, the tooth surfaces of the gear plate 40 face upward to form an collecting device for lubricant, and the presence of the rib 41 further constructs the gear plate as an lubricant reservoir. The tooth tops of the gear 21 in the plate face upwards, and are under the protection of the lubricant in the plate while driven by the input torque. This embodiment is suitable for the case where the inner ring of the bearing is driven by the input torque.

In the specific embodiments shown in FIGS. 2 and 3, the gear plate is reliably fixed or integrally connected (hereinafter collectively referred to as "fixedly arranged") to the inner surface of the inner ring or the outer surface of the outer ring of the bearing. Alternatively, the gear plate may also be fixedly arranged on the upper surface of the bearing ring on an axial side of the bearing. A preferred embodiment is that the gear plate can be directly processed and formed on the upper surface of the bearing ring on the axial side of the bearing during the manufacturing process of the bearing ring (not shown). Compared with the case where the gear plate is fixedly arranged on the radially inner or outer surfaces of the bearing ring, this embodiment not only has more cost advantages and processing convenience, but also makes the gear plate formed on the axial surface of the bearing ring more rigid, which is able to carry and transmit greater driving torque. In addition, the rib can be formed integrally with the gear plate, or otherwise detachably assembled on the gear plate.

Figure 4:
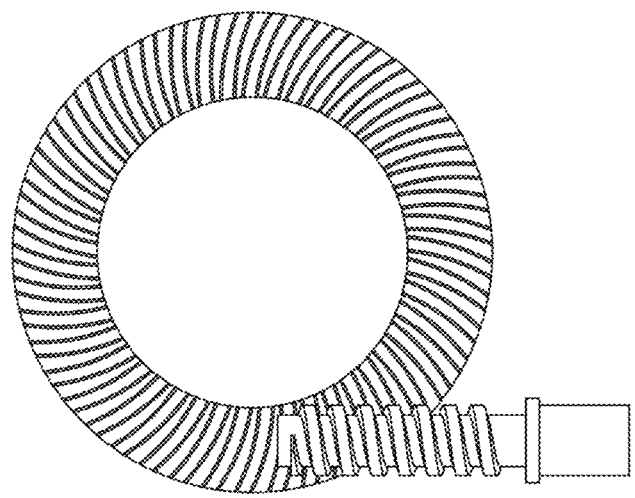
FIG. 4 shows the embodiment of a cross gear transmission being used for applying a drive torque of rotation to the gear plate.
Figure 5:
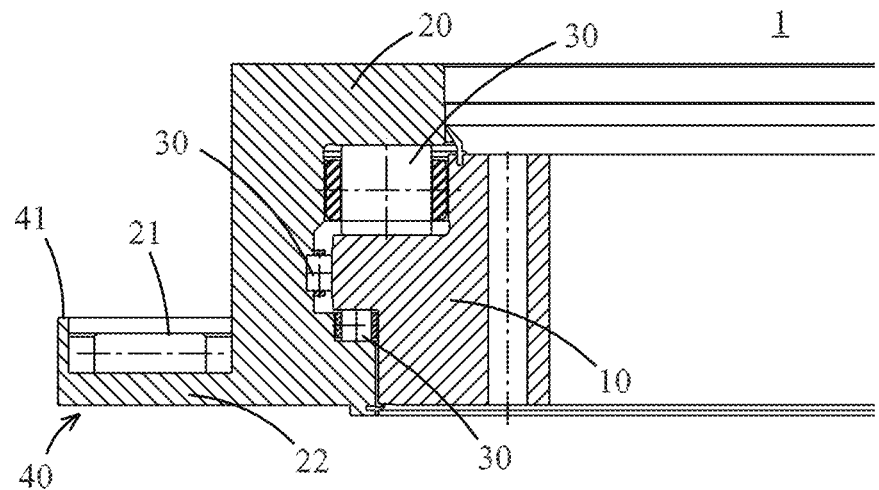
FIG. 5 shows an embodiment of an improved slewing bearing with a gear plate integrally formed with the outer ring of the bearing.
Figure 6:
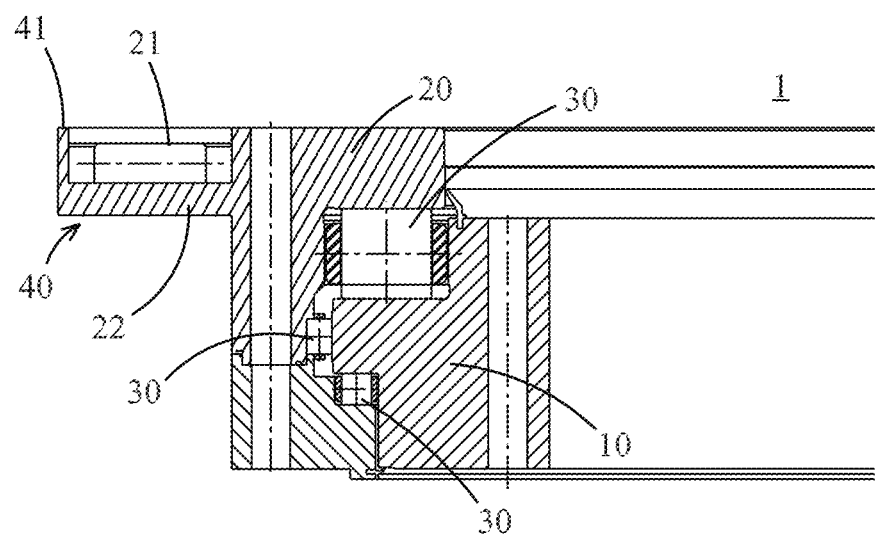
FIG. 6 an embodiment of an improved slewing bearing with a gear plate positioned on the outer ring and positioned on the upper surface of the bearing.
Figure 7:
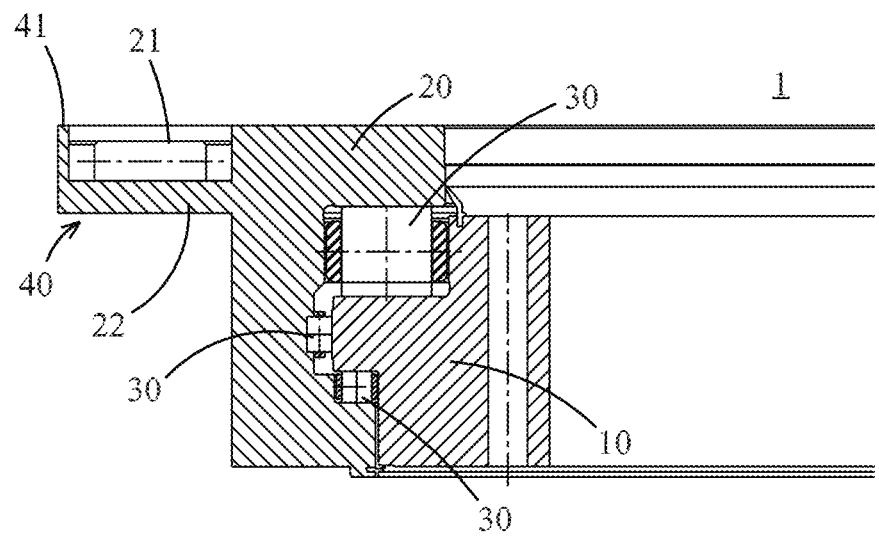
FIG. 7 an embodiment of an improved slewing bearing with a gear plate integrally formed with the outer ring and positioned on the upper surface of the bearing.
Figure 8:
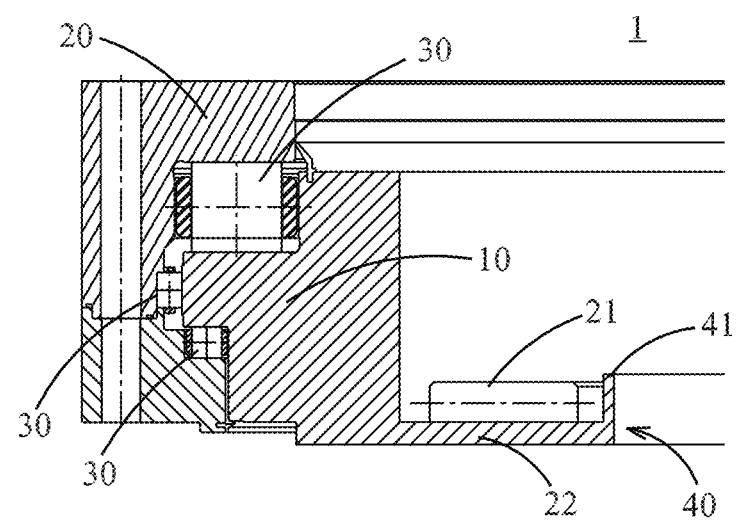
FIG. 8 shows an embodiment of an improved slewing bearing with a gear plate integrally formed with the inner ring of the bearing.
Figure 9:
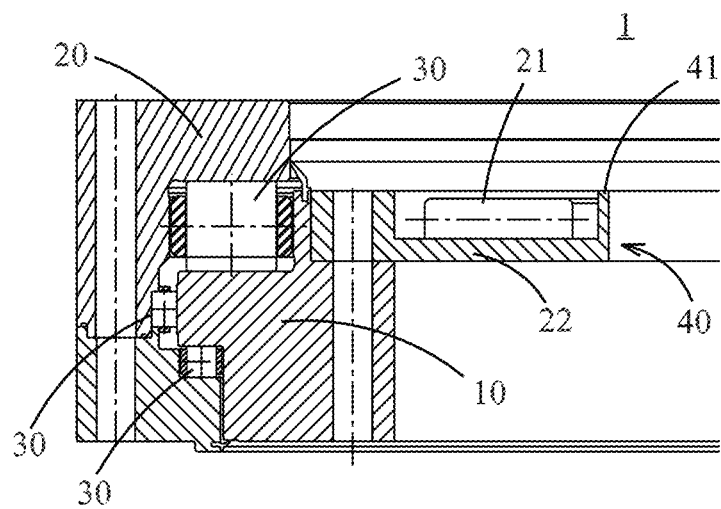
FIG. 9 an embodiment of an improved slewing bearing with a gear plate positioned on the inner ring and positioned on the upper surface of the bearing.
Figure 10:
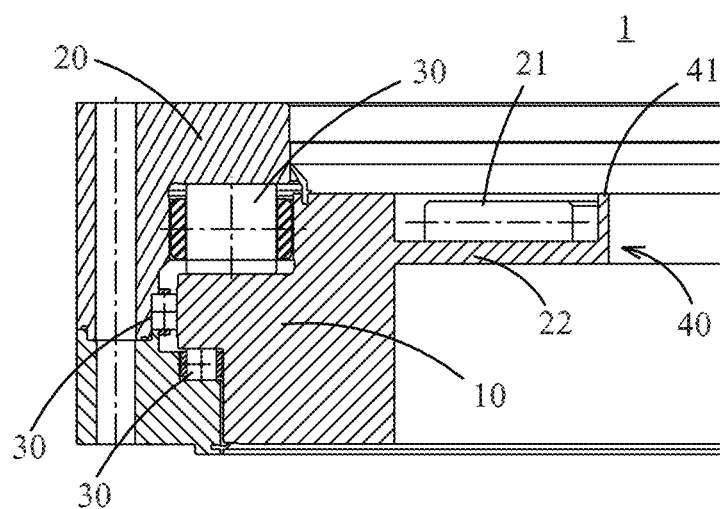
FIG. 10 an embodiment of an improved slewing bearing with a gear plate integrally formed with the inner ring and positioned on the upper surface of the bearing.

The important innovation of the present invention also lies in the modification of radial gears with outward tooth surfaces to axial gears with upward tooth surfaces, so as to meet the application needs of the gear plate to store the lubricant through the horizontal placement in the vertical application of the bearing. In order to adapt to the change of tooth surface orientation, the external input torque can drive the gears in the gear plate through a cross gear drive or a worm drive. FIG. 4 is a schematic diagram showing this driving mode. Compatible with this transmission mode, the gears in the gear plate can be spur gears or helical gears, depending on the need for the torque input.

Compared with the radial gears, the axial gears are designed to be suitable for all types of lubrication, and there are no strict restrictions on the types of lubricants. For example, the lubricant can be either a high viscosity lubricating oil or a very high dynamic viscosity grease, totally depending on the requirements of the gear transmission.

The above-mentioned change of the tooth surface orientation does not constitute any restriction on the rotation mechanism of the bearing and the arrangement of the rolling elements. Like traditional structures, the slewing bearing can have either one row of rolling elements or two or more rows of rolling elements; the rolling elements can be either spherical rollers or other types of rollers; the rolling elements do not exclude the use of cross rollers.

Taking the field of wind power generation as an example, the entire wind turbine can be regarded as a support device with a vertical structure, including a tower tube (referred to as the "first member"), a capsule supported by the tower tube (referred to as the "second member") and a slewing bearing that acts as a rotary support between the tower tube and the capsule. The tower tube is fixedly connected to one of the bearing rings, and the capsule is fixedly connected to the other of the bearing rings. When the gears provided on the other of the bearing rings are driven by an input torque, it will drive the capsule to rotate relative to the tower tube. This is actually a typical embodiment of the present invention used as a yaw bearing of the wind turbine. Of course, this application does not limit the application of the present invention to other types of vertical structure supports.

Those skilled in the art should understand that the above-mentioned slewing bearing and the applications thereof are not limited by the specific embodiments. More general technical solutions will be subject to the limitations in the appended claims. For any changes and improvements to the present invention, as long as they meet the limitations of the appended claims, they shall fall within the protection scope of the present invention.

The invention claimed is:

1. A slewing bearing for vertical structural support, comprising a first bearing ring, a second bearing ring and at least one row of rolling elements arranged between the first and second bearing rings, one of the group of the first bearing ring and the second bearing ring being integrally formed with a gear for receiving the drive of an input torque, wherein the gear is provided axially thereunder with a lubricant collecting member for collecting and storing a lubricant, the gear having a plurality of gear teeth which are aligned with an upper surface of the one of the group of the first bearing ring and the second bearing ring.

2. The slewing bearing according to claim 1, wherein the gear has a gear plate which has at a radial edge thereof a rib for blocking the outflow of the lubricant.

3. A slewing bearing for vertical structural support, comprising a first bearing ring, a second bearing ring and at least one row of rolling elements arranged between the first and second bearing rings, said first or second bearing ring being provided with a gear for receiving the drive of an input torque, wherein the gear is provided axially thereunder with a lubricant collecting member for collecting and storing a lubricant, wherein the lubricant collecting member and the gear are integrally formed and fixedly arranged on one of the group of the first bearing ring and the second bearing ring in the form of a gear plate.

4. The slewing bearing according to claim 3, wherein the gear plate is fixedly arranged on the radially inner surface or the radially outer surface of the first or second bearing ring.

5. The slewing bearing according to claim 4, wherein the gear faces radially outward, and a tooth width direction is substantially the same as an axial direction of the bearing.

6. The slewing bearing according to claim 3, wherein the gear plate is fixedly arranged on the upper surface of the first or second bearing ring on an axial side of the bearing.

7. The slewing bearing according to claim 6, wherein the gear plate is directly processed and formed on the upper surface of the first or second bearing ring on the axial side of the bearing.

8. The slewing bearing according to claim 6, wherein the tooth surfaces of the gear plate face upward, and a tooth height direction is substantially consistent with the axial direction of the bearing.

9. The slewing bearing according to claim 8, wherein the gear is driven by the input torque through one of the group of a cross gear drive and a worm drive.

10. A rotary support device for supporting in a vertical structure, comprising: a first member that supports substantially in a vertical direction, a second member that is substantially supported by the first member in the vertical direction, and a slewing bearing for the vertical structural support, comprising a first bearing ring, a second bearing ring and at least one row of rolling elements arranged between the first and second bearing rings, the second bearing ring being integrally formed with a gear for receiving the drive of an input torque, wherein the gear is provided axially thereunder with a lubricant collecting member for collecting and storing a lubricant, wherein the first member is fixedly connected to the first bearing ring of the bearing, and the second member is fixedly connected to the second bearing ring of the bearing, the gear having a plurality of gear teeth which are aligned with an upper surface of the second bearing ring, wherein when the gear arranged on the second bearing ring is driven by the input torque, it will drive the second member to rotate relative to the first member.

* * * * *